United States Patent
Davis et al.

(10) Patent No.: US 12,511,858 B1
(45) Date of Patent: Dec. 30, 2025

(54) METHODS AND APPARATUS FOR AUTOMATICALLY READING A LATERAL FLOW ASSAY

(71) Applicant: C2Sense, Inc., Watertown, MA (US)

(72) Inventors: Gabriel Davis, Aliquippa, PA (US);
Jason R. Cox, Ashland, MA (US);
Robert Deans, Grafton, MA (US);
Joseph J. Walish, West Roxbury, MA (US)

( * ) Notice: Subject to any disclaimer, the term of this patent is extended or adjusted under 35 U.S.C. 154(b) by 605 days.

(21) Appl. No.: 17/899,751

(22) Filed: Aug. 31, 2022

Related U.S. Application Data

(60) Provisional application No. 63/239,850, filed on Sep. 1, 2021.

(51) Int. Cl.
| | |
|---|---|
| G06V 10/143 | (2022.01) |
| G06T 5/70 | (2024.01) |
| G06T 7/11 | (2017.01) |
| G06V 10/141 | (2022.01) |

(52) U.S. Cl.
CPC .............. *G06V 10/143* (2022.01); *G06T 5/70* (2024.01); *G06T 7/11* (2017.01); *G06V 10/141* (2022.01); *G06T 2207/10024* (2013.01)

(58) Field of Classification Search
CPC ...... G06V 10/143; G06V 10/141; G06T 5/70; G06T 7/11; G06T 2207/10024; G06T 7/0012; G01N 33/54388; G01N 33/558; G01N 2021/6439; G01N 2021/7759; G01N 2021/7786; G01N 21/274; G01N 33/53; G01N 35/00693; G01N 33/54389; G16H 10/40; G16H 30/40; G16H 50/30

See application file for complete search history.

(56) References Cited

U.S. PATENT DOCUMENTS

| | | | |
|---|---|---|---|
| 2013/0161190 A1* | 6/2013 | Ewart | G01N 33/492 204/403.03 |
| 2014/0334980 A1* | 11/2014 | Graham | G01N 35/00722 422/69 |
| 2016/0223536 A1* | 8/2016 | Johnson | G01N 21/6428 |
| 2017/0184585 A1* | 6/2017 | Markovsky | G01N 33/54366 |
| 2022/0084659 A1* | 3/2022 | Rowe | G06V 10/993 |

OTHER PUBLICATIONS

H. Kong, H. C. Akakin and S. E. Sarma, "A Generalized Laplacian of Gaussian Filter for Blob Detection and Its Applications," in IEEE Transactions on Cybernetics, vol. 43, No. 6, pp. 1719-1733, Dec. 2013, doi: 10.1109/TSMCB.2012.2228639. (Year: 2013).*

* cited by examiner

*Primary Examiner* — Sumati Lefkowitz
*Assistant Examiner* — Aaron Joseph Sorrin
(74) *Attorney, Agent, or Firm* — Wolf, Greenfield & Sacks, P.C.

(57) ABSTRACT

Methods and apparatus for automatically determining a diagnostic test result from a lateral flow assay are provided. The method comprises receiving at least one image of the lateral flow assay, identifying, with a hardware computer processor, a view window in the at least one image, determining, within the identified view window, a first signal strength for a control line and a second signal strength for one or more test lines, determining the diagnostic test result based on the first signal strength and/or the second signal strength, and outputting an indication of the diagnostic test result.

32 Claims, 15 Drawing Sheets ly disclosed.
METHODS AND APPARATUS FOR AUTOMATICALLY READING A LATERAL FLOW ASSAY

RELATED APPLICATIONS

This application claims priority under 35 U.S.C. § 119 (e) to U.S. Provisional Application No. 63/239,850, filed Sep. 1, 2021, and entitled "METHODS AND APPARATUS FOR AUTOMATICALLY READING A LATERAL FLOW ASSAY" which is incorporated herein by reference in its entirety for all purposes.

BACKGROUND

Sensing technology is being used in a wide variety of applications such as safety, security, process monitoring, and air quality control. However, many sensors are limited by complex manufacturing processes, low sensitivity, and/or false indications of detection. As such, the applications of such sensors are often limited.

Molecular and biological diagnostic tests generally leveraging the low-cost nature and ubiquity of lateral flow assays as well as vertical flow assays and genetic assays based on biological components such as antigens, antibodies, and nucleotides are critical to ensuring public health and safety. Although these assays are easy to use, they are typically analyzed visually using the human eye which injects a high degree of variability and/or subjectivity into the data interpretation. To address this shortcoming, new approaches employing automation and machine vision are necessary to improve the sensitivity and accuracy of lateral flow assays. Although smartphones have recently been used to provide high-resolution image acquisition and analysis, these methods are still limited.

Accordingly, improved methods and systems are needed.

SUMMARY

Articles, systems, and methods for automatic reading of a lateral flow assay are generally disclosed.

Some embodiments relate to a diagnostic reader device, comprising a test interface configured to receive a cassette having disposed therein a lateral flow assay, at least one light source configured to illuminate the lateral flow assay when present in the test interface, an imaging device configured to capture at least one image of the lateral flow assay after illumination with the at least one light source, and a hardware computer processor programmed to analyze the at least one image to determine a diagnostic test result. Analyzing the at least one image comprises identifying a view window in the at least one image, determining, within the identified view window, a first signal strength for a control line and a second signal strength for one or more test lines, determining the diagnostic test result based on the first signal strength and/or the second signal strength, and outputting an indication of the diagnostic test result.

In at least one aspect, the at least one light source comprises one or more light emitting diodes.

In at least one aspect, the one or more light emitting diodes include one or more ultraviolet light emitting diodes.

In at least one aspect, the imaging device is configured to capture at least one RGB image of the lateral flow assay.

In at least one aspect, the diagnostic reader device further comprises a controller configured to control a timing of illumination of the lateral flow assay and a timing of capture of the at least one image by the imaging device.

In at least one aspect, controlling a timing of illumination of the lateral flow assay comprises controlling a timing of illumination of the lateral flow assay at different times, durations, wavelengths, or locations in the lateral flow assay.

In at least one aspect, controlling a timing of illumination of the lateral flow assay at different wavelengths comprises illuminating the lateral flow assay with first illumination having at least one first wavelength at a first time and illuminating the lateral flow assay with second illumination having at least one second wavelength at a second time after the first time.

In at least one aspect, the first illumination corresponds to white light and the second illumination corresponds to ultraviolet light.

In at least one aspect, controlling a timing of illumination of the lateral flow assay at different locations comprises illuminating a first portion of the lateral flow assay with first illumination at a first time and illuminating a second portion of the lateral flow assay with second illumination at a second time after the first time, wherein the first portion includes a location on lateral flow assay in which the control line is expected to appear and wherein the second portion includes a location on the lateral flow assay in which the one or more test lines are expected to appear.

In at least one aspect, the diagnostic reader device further comprises a circuit board having integrated thereon, the hardware computer processor.

In at least one aspect, the diagnostic reader device further comprises a wireless communications interface, and wherein outputting the indication of the diagnostic test result comprises transmitting the diagnostic test result to at least one computing device external to the diagnostic reader device via the wireless communications interface.

In at least one aspect, the at least one computing device is a smartphone, a tablet computer, or a desktop computer.

In at least one aspect, the hardware computer processor is further programmed to receive user-defined parameters and calibration data, and analyzing the at least one image comprises analyzing the at least one image based, at least in part, on the received user-defined parameters and/or the calibration data.

In at least one aspect, the user-defined parameters relate to a design of the lateral flow assay in the at least one image.

In at least one aspect, the user-defined parameters includes one or more parameters selected from the group consisting of dimensions of the lateral flow assay, visual appearance information, and nominal positions of the control line and/or the one or more test lines.

In at least one aspect, the calibration data relates to one or more characteristics of the diagnostic reader device.

In at least one aspect, the calibration data includes one or more of optical magnification data, expected lateral flow assay orientation data, or lateral flow assay direction data.

In at least one aspect, identifying a view window in the at least one image comprises identifying first parallel sides of the view window, identifying second parallel sides of the view window, and identifying the view window based on the identified first and second parallel sides.

In at least one aspect, the view window is a rectangle comprising long sides and short sides, and identifying first parallel sides comprises identifying the long sides of the rectangle.

In at least one aspect, the at least one image comprises an RGB image, and identifying the long sides of the rectangle comprises extracting a first image from the RGB image, wherein the first image is a single-color channel image or a grayscale image, applying a noise reduction filter to the first image to produce a second image, estimating a gradient magnitude at each pixel in the second image, producing a binary edge map by applying a thresholding operation to the estimated gradient magnitude estimated for each pixel in the second image, segmenting the binary edge map to identify pixels corresponding to a set of edge points consistent with two parallel lines separated by a predetermined distance, and identifying the long sides of the rectangle based on the identified pixels corresponding to the set of edge points.

In at least one aspect, applying a noise reduction filter comprises applying a two-dimensional Gaussian smoothing filter.

In at least one aspect, identifying second parallel sides comprises identifying the short sides of the rectangle.

In at least one aspect, the at least one image comprises an RGB image, and identifying the short sides of the rectangle comprises cropping a portion of the RGB image based on the identified long sides of the rectangle, extracting, from the cropped RGB image, a third image, wherein the third image is a single-color channel image or a grayscale image and has a long dimension and a short dimension, determining, from the third image, a one-dimensional intensity signal by averaging pixel values across the short dimension of the third image, and identifying the short sides of the rectangle by applying one-dimensional edge detection at each end of the one-dimensional intensity signal.

In at least one aspect, applying one-dimensional edge detection comprises determining a gradient of the one-dimensional intensity signal, and selecting one or more peaks in the determined gradient of the one-dimensional intensity signal.

In at least one aspect, identifying the view window based on the identified first and second parallel sides comprises identifying the view window based, at least in part, on the first parallel sides being perpendicular to the second parallel sides.

In at least one aspect, the at least one image comprises an RGB image, and determining, within the identified view window, a first signal strength for a control line and a second signal strength for one or more test lines comprises cropping a portion of the RGB image corresponding to the identified view window, wherein the cropped portion has a long dimension and a short dimension, determining a one-dimensional intensity signal by averaging across the short dimension of the cropped portion, identifying local peaks based on the one-dimensional intensity signal, and determining the first signal strength and the second signal strength based on the identified local peaks.

In at least one aspect, determining, within the identified view window, a first signal strength for a control line and a second signal strength for one or more test lines further comprises performing baseline correction on the one-dimensional intensity signal to generate a baseline corrected intensity signal, and applying a noise reduction filter to the baseline corrected intensity signal to produce a noise corrected intensity signal, wherein identifying local peaks comprises identifying local peaks based on the noise corrected intensity signal.

In at least one aspect, the one-dimensional intensity signal comprises a red-channel intensity signal, a green-channel intensity signal, a blue-channel intensity signal or a grayscale intensity signal.

In at least one aspect, determining a second signal strength for one or more test lines comprises determining a second signal strength for each of a first test line and a second test line, and determining the diagnostic test result is further based on the second signal strength determined for the first test line and the second signal strength determined for the second test line.

In at least one aspect, the indication of the diagnostic test result indicates whether the test was invalid, negative or positive.

In at least one aspect, the indication of the diagnostic test result is a numerical value.

Some embodiments relate to a method of automatically determining a diagnostic test result from a lateral flow assay. The method comprises receiving at least one image of the lateral flow assay, identifying, with a hardware computer processor, a view window in the at least one image, determining, within the identified view window, a first signal strength for a control line and a second signal strength for one or more test lines, determining the diagnostic test result based on the first signal strength and/or the second signal strength, and outputting an indication of the diagnostic test result.

Some embodiments relate to a non-transitory computer readable medium having encoded thereon, a plurality of instructions that, when executed by a hardware computer processor, perform a method comprising receiving at least one image of the lateral flow assay, identifying, with a hardware computer processor, a view window in the at least one image, determining, within the identified view window, a first signal strength for a control line and a second signal strength for one or more test lines, determining the diagnostic test result based on the first signal strength and/or the second signal strength, and outputting an indication of the diagnostic test result.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

The inventors have recognized that some conventional techniques for analyzing lateral flow assays (LFAs) that rely on human visual inspection to determine a diagnostic test result can be improved using an automated image analysis approach. To this end, some embodiments of the present disclosure relate to a method, computer-readable medium, and diagnostic reader device for automatically reading a lateral flow assay to determine a diagnostic test result.

Figure 1:
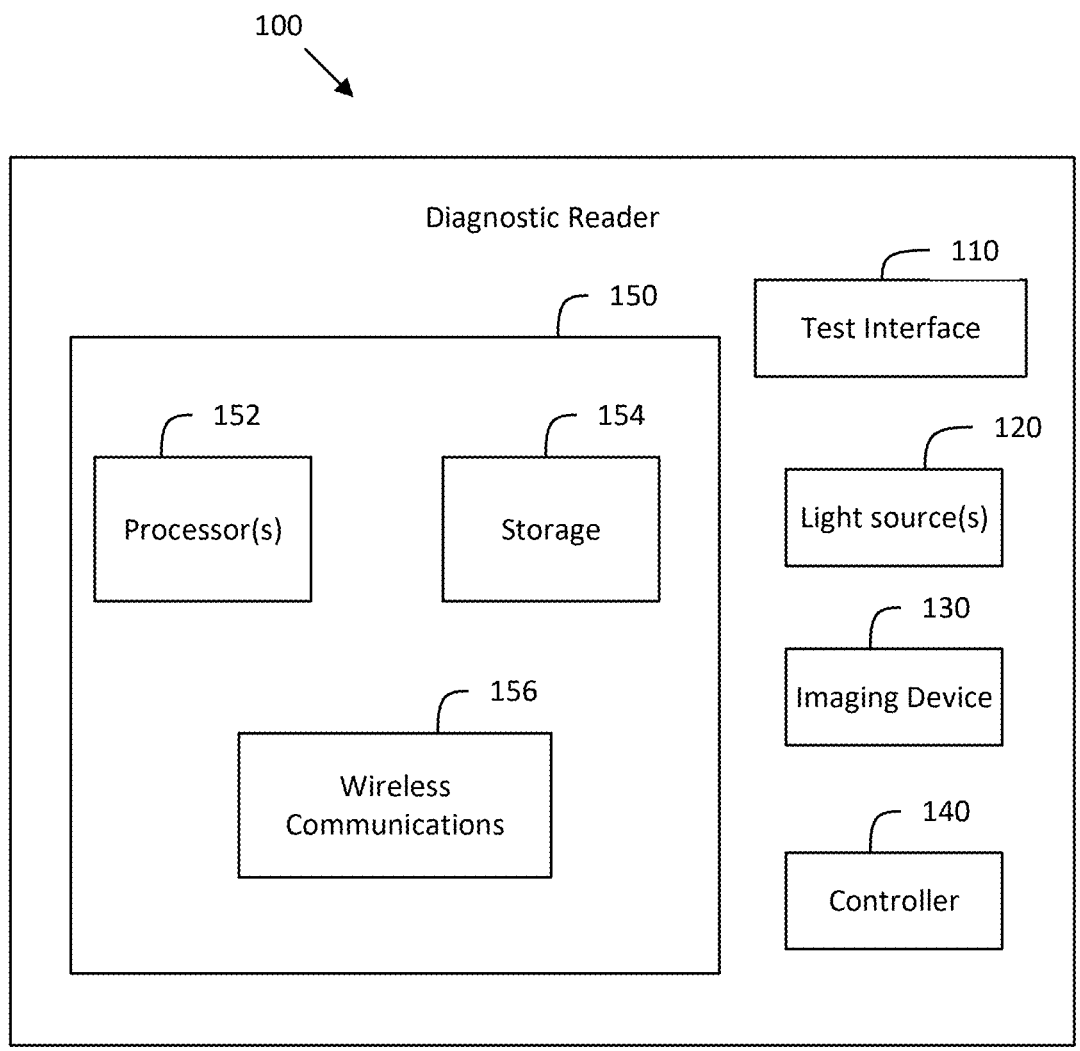
FIG. 1 is a schematic block diagram of a diagnostic reader device, in accordance with some embodiments.

FIG. 1 illustrates an example of a diagnostic reader device 100 in accordance with some embodiments. Diagnostic reader device 100 includes a test interface 110 configured to receive a cassette having disposed therein a lateral flow assay (LFA). The cassette may be a disposable mechanical enclosure into which an LFA loaded with a prepared biological sample may be inserted. After the sample is loaded onto the LFA, the cassette may be inserted into the test interface 110 of the reader device 100. As shown, diagnostic reader device 100 also includes one or more light sources 120, an imaging device 130, and a controller 140. In some embodiments, light source(s) 120 include one or more ultraviolet (UV) light sources configured to illuminate the LFA when present in the test interface 110 of the reader device 100. For instance, the one or more light sources may include one or more light emitting diodes (LEDs) (e.g., ultraviolet LEDs) configured to illuminate the LFA with light. In some embodiments, the one or more light sources may include light sources configured to output light having different wavelengths. For instance, the light source(s) may include a first light source configured to output white light and a second light source configured to output ultraviolet light. Controller 140 may be operatively coupled to light source(s) 120 and may be configured to control a timing of illumination of the LFA by light source(s) 120. For instance, after a cassette with the LFA is inserted into test interface 110, a particular incubation time period may pass prior to illumination of the LFA with light source(s) 120. Following the incubation time period, controller 140 may be configured to control light source(s) 120 to illuminate the LFA. In some instances, controller 140 may be configured to control light source(s) 120 to illuminate the LFA at different times, durations, wavelengths, or locations in the LFA. For example, the LFA may be illuminated with first illumination having at least one first wavelength (e.g., white light) at a first time and may be illuminated with second illumination having at least one second wavelength (e.g., ultraviolet light) at a second time before or after the first time. In some instances, controller 140 may be configured to control light source(s) 120 to illuminate the LFA at a first portion of the LFA with first illumination at a first time and illuminate the LFA with second illumination at a second time before or after the first time. The first portion may include a location on lateral flow assay in which the control line is expected to appear and the second portion may include a location on the lateral flow assay in which the one or more test lines are expected to appear.

Controller 140 may also be configured to control imaging device 130 to capture one or more images of the illuminated LFA. In some embodiments, imaging device 130 may be a red-green-blue (RGB) camera configured to capture full-color (e.g., RGB) images of the illuminated LFA.

Diagnostic reader device 100 further includes onboard computing device 150 configured to analyze the one or more images captured by the imaging device 130. Computing device 150 includes one or more hardware computer processors 152, storage 154, and wireless communication circuitry 156 configured to wirelessly communicate with one or more devices (e.g., a smartphone) external to diagnostic reader device 100. In some embodiments, computing device 150 is implemented as a single-board computer having disposed thereon processor(s) 152, storage 154 and wireless communication circuitry 156.

Although all of the computing analysis of one or more images captured by imaging device 130 described herein is described as being performed by processor(s) 152 located onboard the diagnostic readers device, it should be appreciated that some or all of the computing analysis may alternatively be performed using one or more hardware computer processors located external to diagnostic reader device 100. For instance, in some embodiments, one or more images captured by imaging device 130 may be processed in part by onboard computing resources and in part by computing resources external to the reader device 100.

In some embodiments, diagnostic reader device 100 may be implemented, at least in part, by a mobile computing device (e.g., a smartphone) coupled to a housing (e.g., a case) that includes one or more components of the reader device 100. For instance, the housing may include test interface 110 configured to receive a cassette with an LFA and the smartphone may include one or more of the light source(s) 120, the imaging device 130, the controller 140, and the onboard computing device 150 programmed to analyze one or more images captured by the imaging device 130. In other embodiments, the housing may include imaging device 130, light source(s) 120 and controller 140, with the onboard computing device of the smartphone being used only for analysis of images. Other configurations (including those that do not include a smartphone) are also contemplated.

Figure 2A:
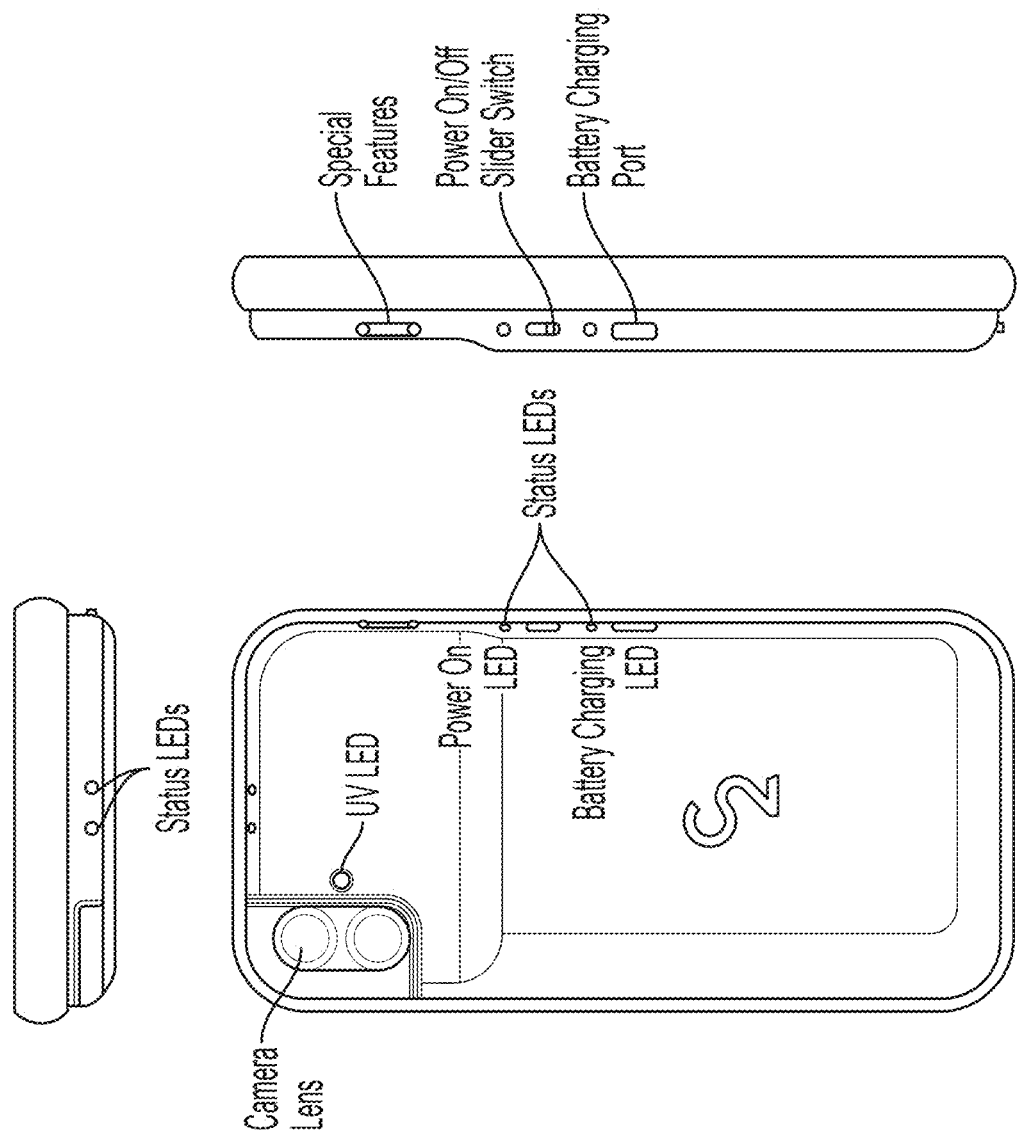
FIG. 2A shows a case configured to integrate with a smartphone to automatically read a lateral flow assay, in accordance with some embodiments.
Figure 2B:
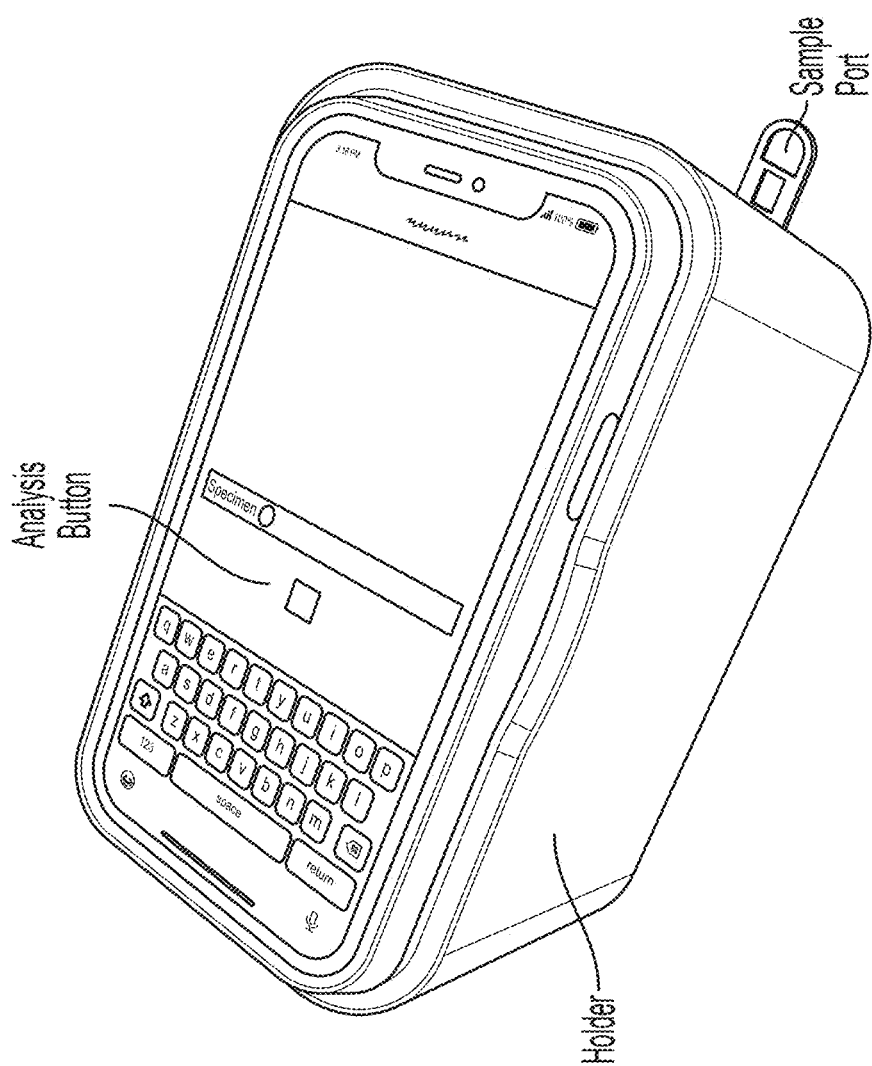
FIG. 2B shows an exemplary holder comprising a portion configured to receive the smartphone, and a sample port configure to receive a sample (e.g., an immunoassay cassette), in accordance with some embodiments.

FIGS. 2A and 2B show an exemplary system for reading data from an LFA, according to some embodiments described herein. FIG. 2A shows a case configured to integrate with a smartphone, comprising a UV LED source and permits the camera of the smartphone to be exposed. FIG. 2B shows an exemplary holder comprising a portion configured to receive the smartphone, and a sample port configure to receive a sample (e.g., an immunoassay cassette).

Figure 2C:
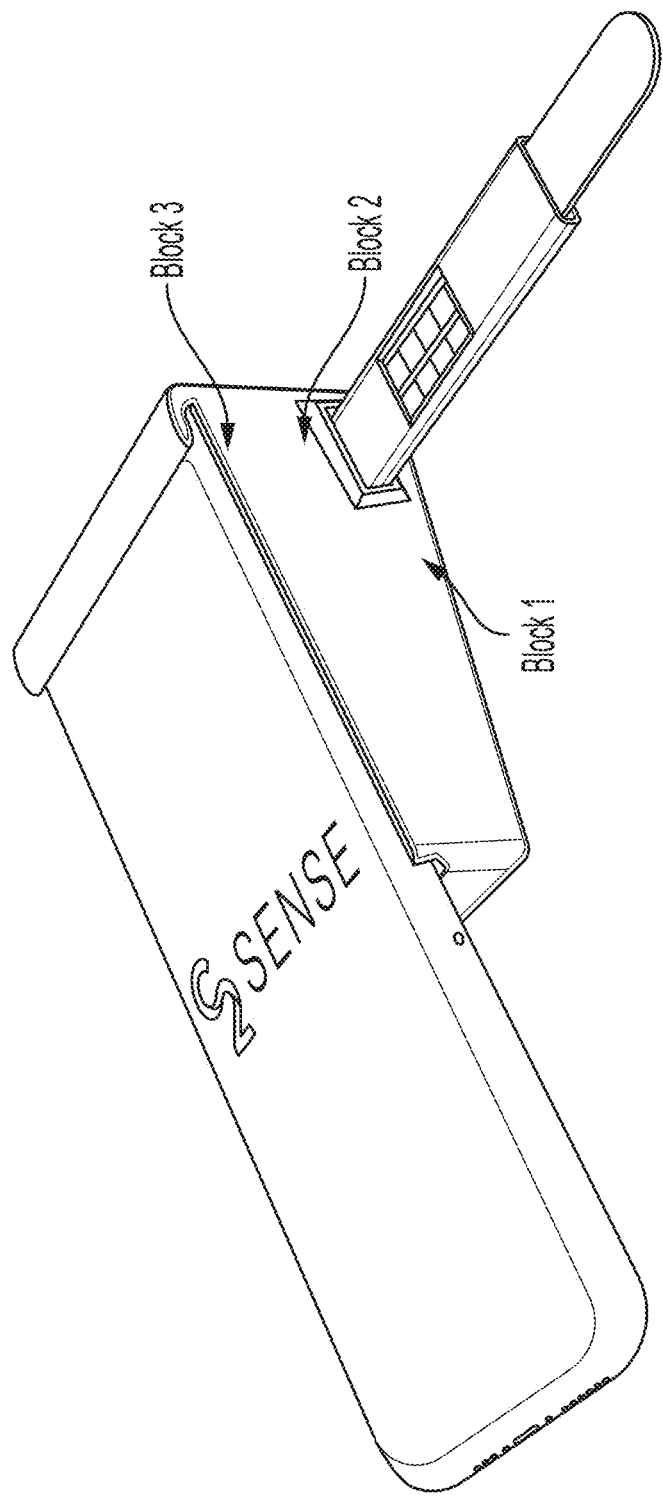
FIG. 2C shows an illustrative kit, in accordance with some embodiments.

An illustrative device (FIG. 2C) that prevents stray light from interfering with the measurement of an immunoassay, accepts an immunoassay cassette, positions the camera of a smartphone relative to the assay for interrogation, and includes a combination of components such as a light emitting diode (LED), an optical filter, a polarizer, a lens, a battery, a diode (indicator light) and a printed circuit board (PCB) with associated electronic components. The device design is modular to allow for: 1) the interchange of components to address different smartphone types and different assay cassettes; 2) efficiencies in manufacturing; and 3) reduction of waste and environmental impact. The device design may also be configured to read assays in either reflectance or transmission modes.

Figure 2D:
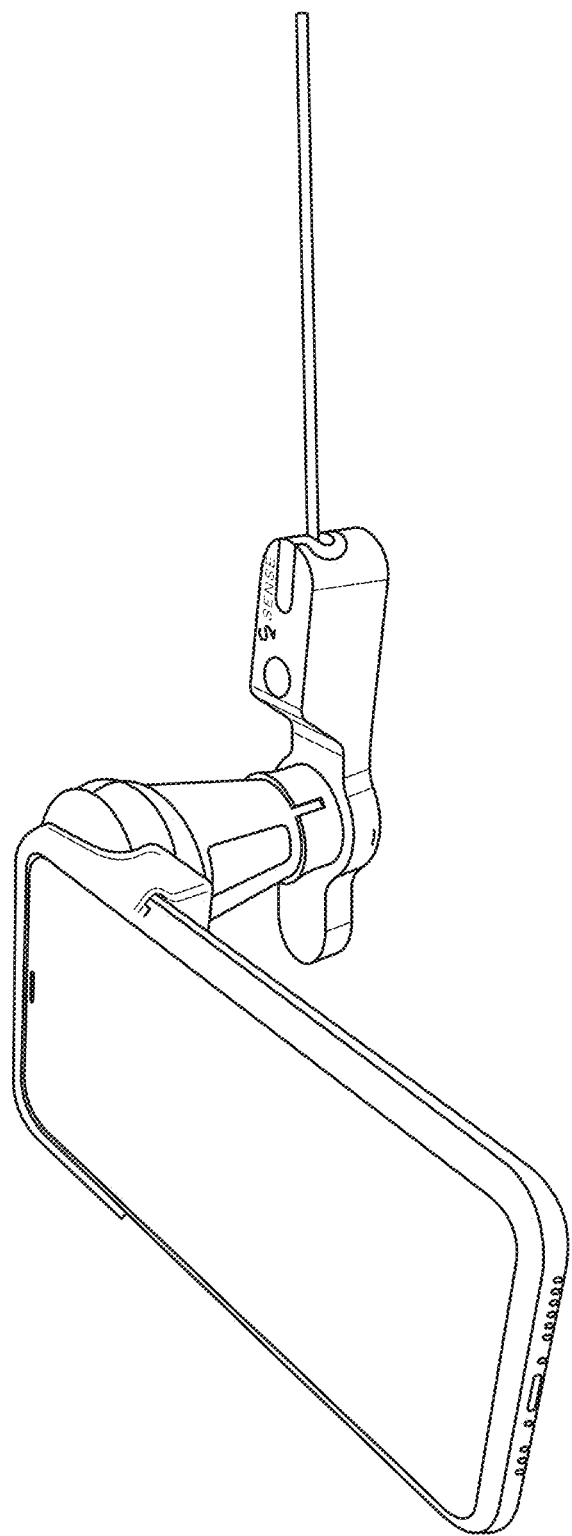
FIG. 2D shows schematics of a design rendering of a rapid, point of need diagnostic, in accordance to some embodiments.
Figure 2E:
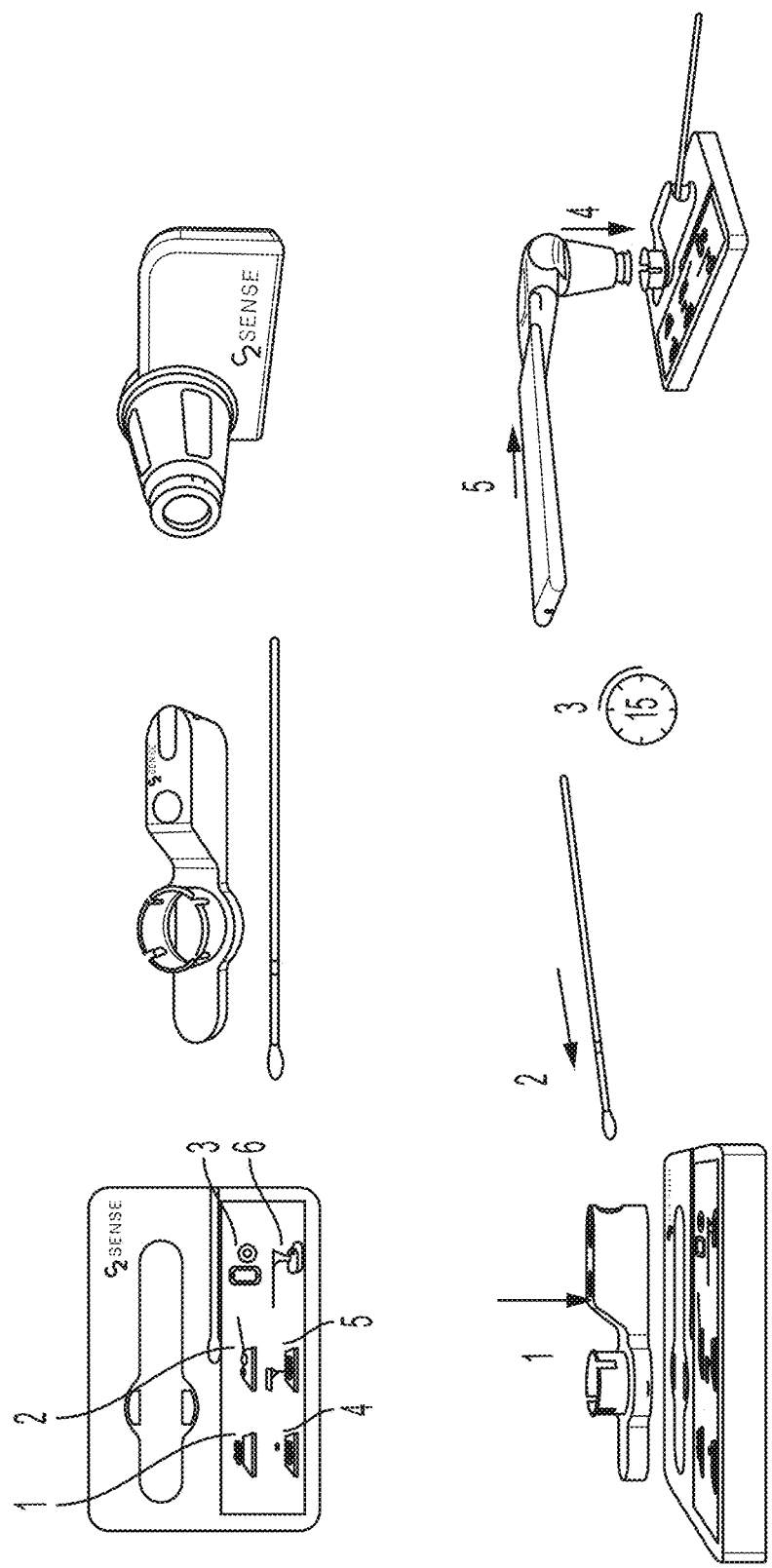
FIG. 2E shows a schematic of a design rendering of the components of the diagnostic illustrated in FIG. 2D, including a set up tray with instructions for use (top left), integrated cassette and sample collection swab (top middle), smartphone adapter (top right), and overall workflow (bottom), in accordance with some embodiments.

Another illustrative device (FIGS. 2D-2E) provides rapid, point of need diagnostics. For example, FIG. 2D shows schematics of a design rendering of the components of the diagnostic: set up tray with instructions for use (top left), integrated cassette and sample collection swab (top middle), smartphone adapter (top right), and overall workflow (bottom). Other components are also possible.

In some embodiments, a diagnostic reader device may be implemented as a standalone device that is not configured to couple to a mobile computing device such as a smartphone. In such embodiments, the diagnostic reader device may include most or all of the components shown in FIG. 1 without having to rely on a separate device such as a smartphone to perform computational analysis of one or more images as described herein.

As discussed above, the inventors have recognized that conventional techniques for reading LFAs by visual inspection can be improved by using automated techniques that analyze one or more images of the LFA to extract signal information for a control line and one or more test lines. In developing such automated techniques, the inventors have recognized challenges specific to automated analysis of images to produce accurate results that are not present when LFAs are read by sight. Some embodiments are directed to novel techniques for addressing these challenges using a diagnostic reader device (e.g., diagnostic reader device 100) that includes computing resources (e.g., onboard computing device 140).

Figure 3:
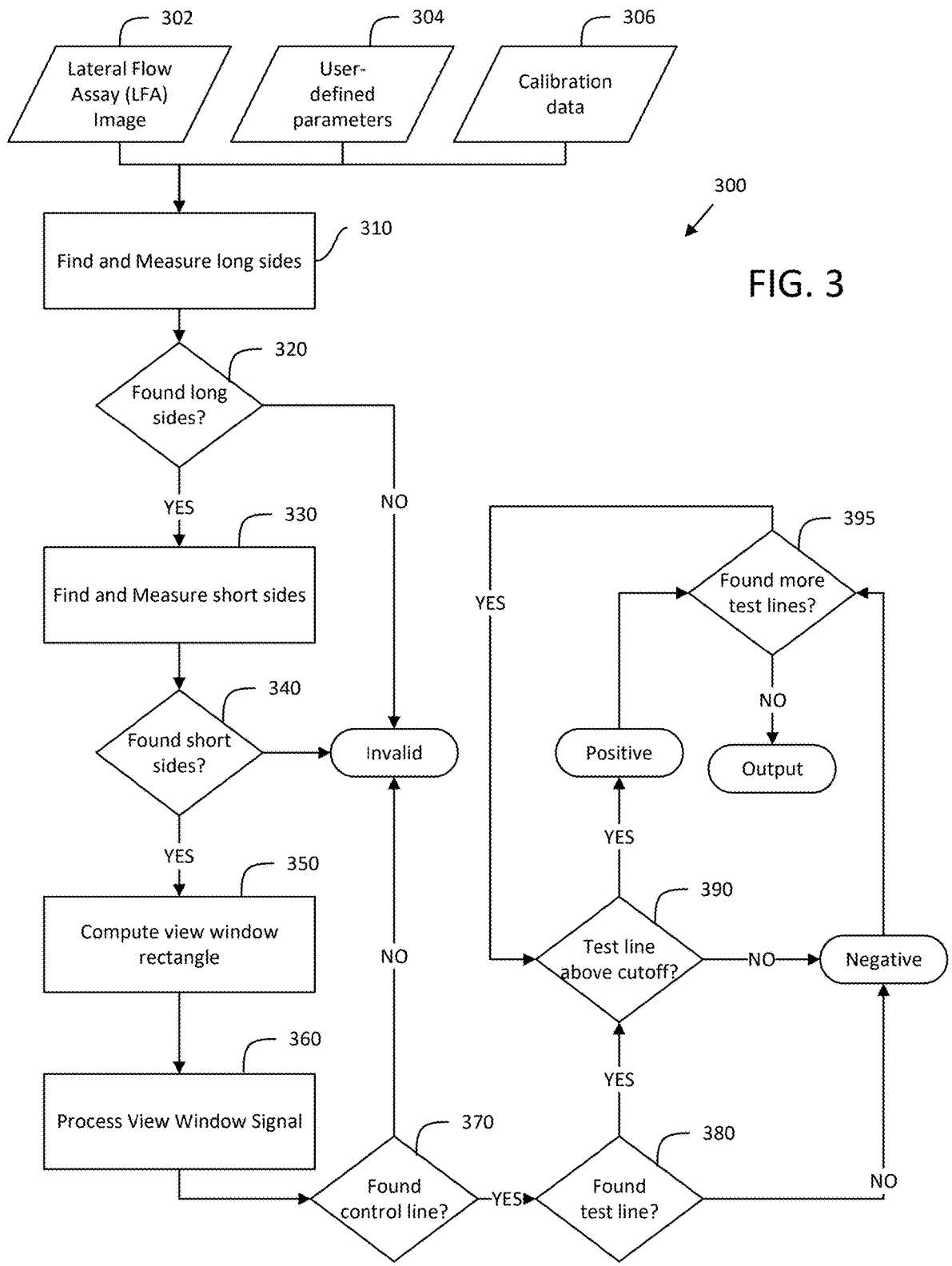
FIG. 3 shows a flowchart of a process for automatically reading a lateral flow assay in accordance with some embodiments.

FIG. 3 is a flowchart of a process 300 for automatically analyzing one or more images of a lateral flow assay to determine a diagnostic test result, in accordance with some embodiments. As described in more detail below, the analysis process shown in FIG. 3 may include two phases, each of which may include several subprocesses. In a first phase (also referred to herein as "assay alignment" and encompassing acts 310-340 in FIG. 3), an image of the LFA is analyzed to automatically locate an LFA view window in the image. In a second phase (also referred to herein as "signal analysis" and encompassing acts 350-390 in FIG. 3), the portion of the image in which the LFA view window was identified is analyzed to identify one or more characteristics of a control line and one or more test lines to determine test validity and/or a positive or negative diagnostic test result. An indication of the diagnostic test result may then be output (e.g., wirelessly) to a device other than the reader device (e.g., a smartphone, a tablet computer or a desktop computer) and/or be displayed or otherwise be provided by the reader device itself.

Figure 5A:
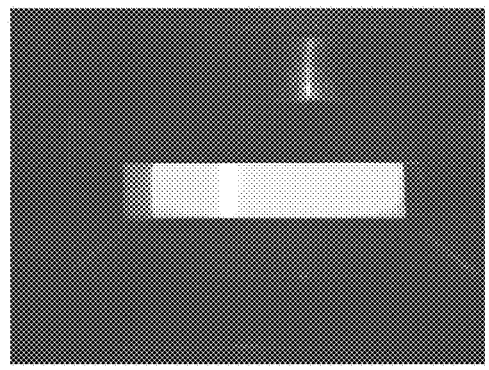
FIG. 5A shows a first example image captured by a diagnostic reader device designed in accordance with some embodiments.
Figure 6A:
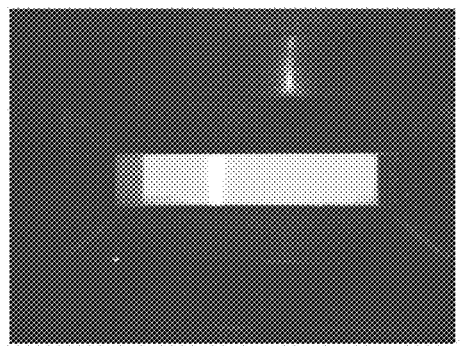
FIG. 6A shows a second example image captured by a diagnostic reader device designed in accordance with some embodiments.

As shown, the data provided as input to the process 300 includes one or more LFA images, user defined parameters, which facilitate adapting and optimizing process 300 for a particular LFA design (e.g., dimensions, visual appearance, nominal positions of control/test lines), and calibration data, which facilitate adapting process 300 to a particular reader device (optical magnification, expected LFA orientation and direction). Non-limiting examples of LFA images captured by an imaging device (e.g., imaging device 130) and that may be processed in accordance with the techniques described herein are shown in FIGS. 5A and 6A.

The assay alignment phase of process 300 begins in act 310, where the long sides of the LFA view window are identified in the image. A further description of subprocesses that may be performed in act 310 are described in further detail below with regard to FIG. 4A. Process 300 then proceeds to act 320, where it is determined whether the long sides of the LFA view window were identified. If it is determined in act 320 that the long sides of the LFA window were not identified, it is determined that the diagnostic test is invalid and cannot be read. Otherwise, process 300 proceeds to act 330, where the short sides of the LFA view window are identified in the image. A further description of subprocesses that may be performed in act 330 are described in further detail below with regard to FIG. 4B. Process 300 then proceeds to act 340, where it is determined whether the short sides of the LFA view window were identified. If it is determined in act 340 that the short sides of the LFA window were not identified, it is determined that the diagnostic test is invalid and cannot be read. Otherwise, process 300 proceeds to act 350 where the view window rectangle is computed based on the long and short sides of the LFA view window identified in acts 310 and 330, respectively. For example, the rectangular boundary of the view window may be calculated from measured parallel lines on the long sides, measured points on the short sides, and assumed perpendicularity of the short sides to the long sides.

Following identification of the view window rectangle in act 350, the assay alignment phase is complete, and process 300 proceeds to the signal analysis phase in act 360, where the signal in the view window rectangle in the image is analyzed to identify a control line and one or more test lines on the LFA. A further description of subprocesses that may be performed in act 360 are described in further detail below with regard to FIG. 4C. Process 300 then proceeds to act 370 where it is determined whether a control line was detected. If it is determined in act 370 that a control line was not identified, it is determined that the diagnostic test is invalid and cannot be read. Otherwise, process 300 proceeds to act 380, where it is determined whether a test lines was identified. If it is determined in act 380 that no test lines were identified, it is determined that the diagnostic test result is negative. Otherwise process 300 proceeds to act 390 where it is determined whether a signal intensity associated with the test line is above a threshold value. If it is determined in act 390 that the signal intensity is below the threshold value, it is determined that the diagnostic test result is negative. Otherwise, it is determined that the diagnostic test result is positive.

In some embodiments the LFA may be designed with a single test (e.g., to test for the presence of a single condition). In such embodiments, only a single test line is expected to be observed in the LFA view window when the diagnostic test result is positive. In other embodiments, the LFA may be designed with multiple independent tests (e.g., to test for multiple different conditions). In such embodiments, multiple test lines are expected to be observed in the LFA view window depending on which of the independent tests yield a positive diagnostic test result. For instance, if the LFA is designed with two independent tests, a positive diagnostic test result for one test may be represented by the presence of a first test line within the LFA view window at a first location within the LFA view window, a positive diagnostic test result for the other test may be represented by the presence of a second test line within the LFA view window at a second location within the LFA view window, and a positive diagnostic test result for both tests may be represented by the presence of both the first and second test lines. The signal intensity detected for any of the test lines when observed in the LFA view window may be compared against a threshold value to determine whether to report a negative or a positive result for the corresponding test, as described above in process 300. For instance, after determining whether a first diagnostic test result is negative or positive, process 300 proceeds to act 395 where it is determined whether additional test lines are detected on the LFA. If it is determined in act 395 that at least one additional test line is detected, process 300 returns to act 390 where it is determined whether the at least one additional test line is above a threshold value. If it is determined in act 390 that the signal intensity is below the threshold value, it is determined that the diagnostic test result for a second test is negative. Otherwise, it is determined that the diagnostic test result for second test is positive.

The process repeats until it is determined in act 395 that all test lines on the LFA have been detected and analyzed to determine a positive or negative diagnostic test result, after which process 300 proceeds to output an indication (e.g., a category or numerical value) for all of the diagnostic test results determined from the LFA.

The indication of the diagnostic test result(s) may be output in any suitable way. For example, in some embodiments an indication of an invalid, negative or positive test result may be provided by the diagnostic reader device itself (e.g., displayed on a display, provided via one or more visual (e.g., LEDs) and/or auditory indicators). In other embodiments, the indication of the diagnostic test result may be sent via one or more wired or wireless networks to another device (e.g., a smartphone or other computing device) for display to a user.

In process 300 described above, the diagnostic test result for an individual test is determined as one of three discrete options-invalid, negative or positive. In other embodiments, the test result output determined by the device may be a numerical value rather than a discrete category. For instance, the output of the signal analysis phase in act 360 may be a numerical value that corresponds to the signal strength of the test line identified in the LFA view window, and an indication of the numerical value may be provided as output. In such embodiments, the device may be considered as a measurement device rather than a diagnostic device.

Figure 4A:
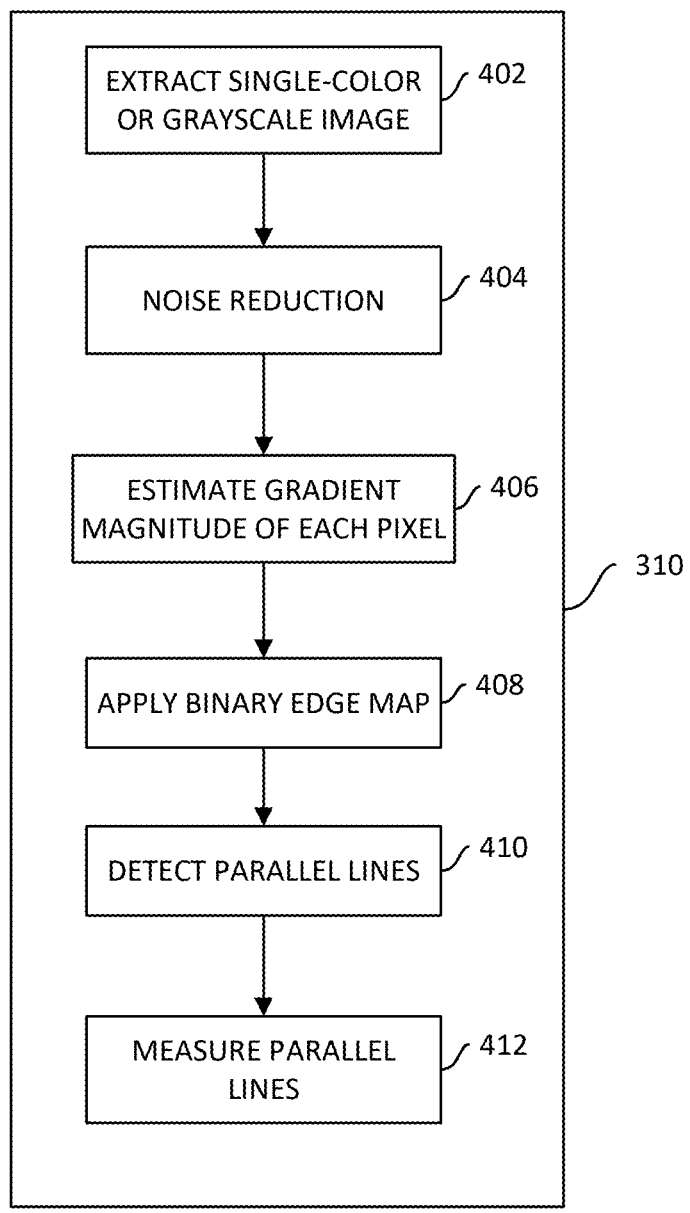
FIG. 4A shows a flowchart of a process for finding and measuring long sides of a view window rectangle in an image, in accordance with some embodiments.
Figure 5B:
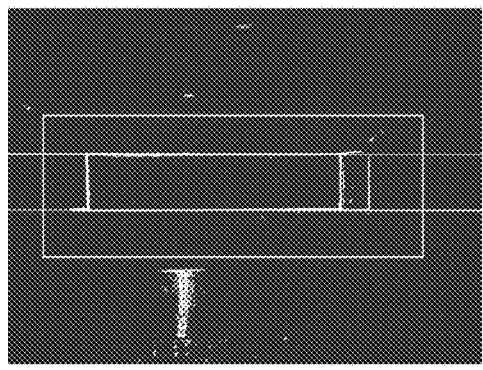
FIG. 5B schematically illustrates detection of a first portion of a view window rectangle, in accordance with some embodiments.
Figure 6B:
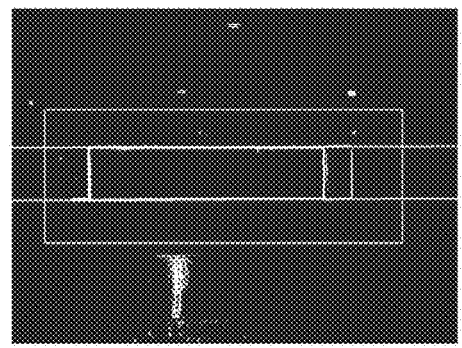
FIGS. 6B-E show analysis of the image in FIG. 6B to read a lateral flow assay, in accordance with some embodiments.

FIG. 4A illustrates a plurality of acts that may be used, in some embodiments, to identify the long sides of the LFA view window in act 310 of process 300. In act 402, an RGB image (e.g., an image captured by imaging device 130) is processed to extract a single-channel color (e.g., red, green or blue) image or grayscale image. In some embodiments, the color channel to extract in act 410 may be specified in user-defined parameters 104. In act 404, a noise reduction filter may be applied to the image extracted in act 402. For example, in some implementations, a 2D Gaussian smoothing filter may be applied to the image, where the size of the filter may be specified, for example, in user-defined parameters 104. In act 406, a gradient magnitude is calculated for each pixel in the noise-reduced image using, for example, a Sobel filter or another suitable technique. In act 408, the gradient magnitude values determined in act 406 are thresholded to produce a binary edge map. In some embodiments, the threshold value used in act 408 may be specified in user-defined parameters 104. In act 410, parallel lines corresponding to the long sides of the LFA view window are determined based on the binary edge map. For example, an inlier/outlier segmentation technique (e.g., random sample consensus) may be applied to the binary edge map to select a subset of edge points consistent with two parallel lines separated by a known distance. In some embodiments, the separation distance between the parallel lines may be specified in user-defined parameters 104. In act 412, the two parallel lines identified in act 410 may be measured. For example, an orthogonal distance fit or similar technique may be applied on selected inlier edge points identified in act 410 to measure the two parallel lines. Non-limiting examples of identifying the long sides of an LFA view window in accordance with some embodiments are shown in FIGS. 5B and 6B.

Figure 4B:
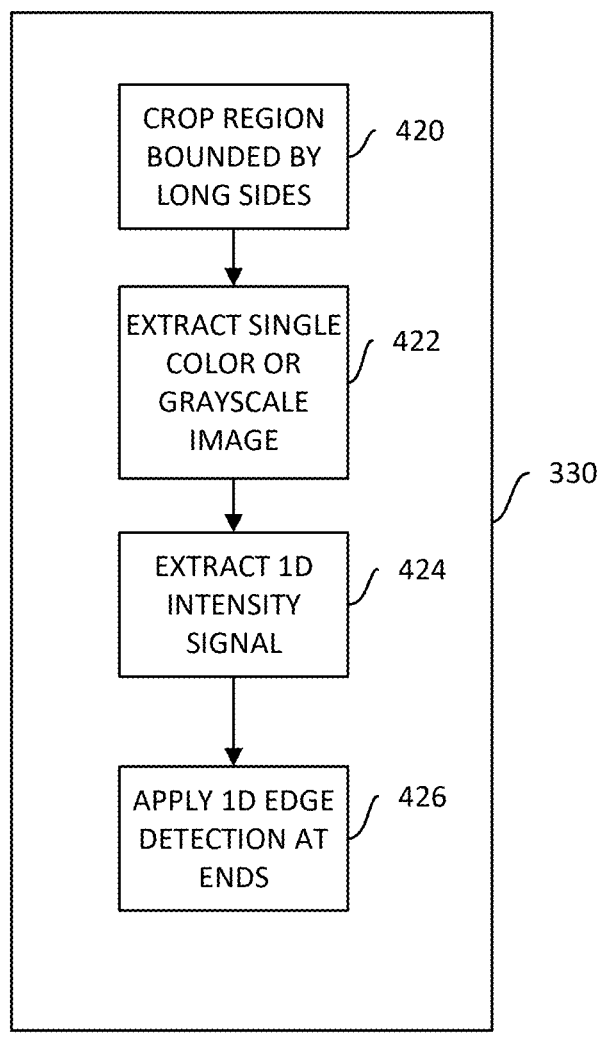
FIG. 4B shows a flowchart of a process for finding and measuring short sides of a view window rectangle in an image, in accordance with some embodiments.
Figure 5C:
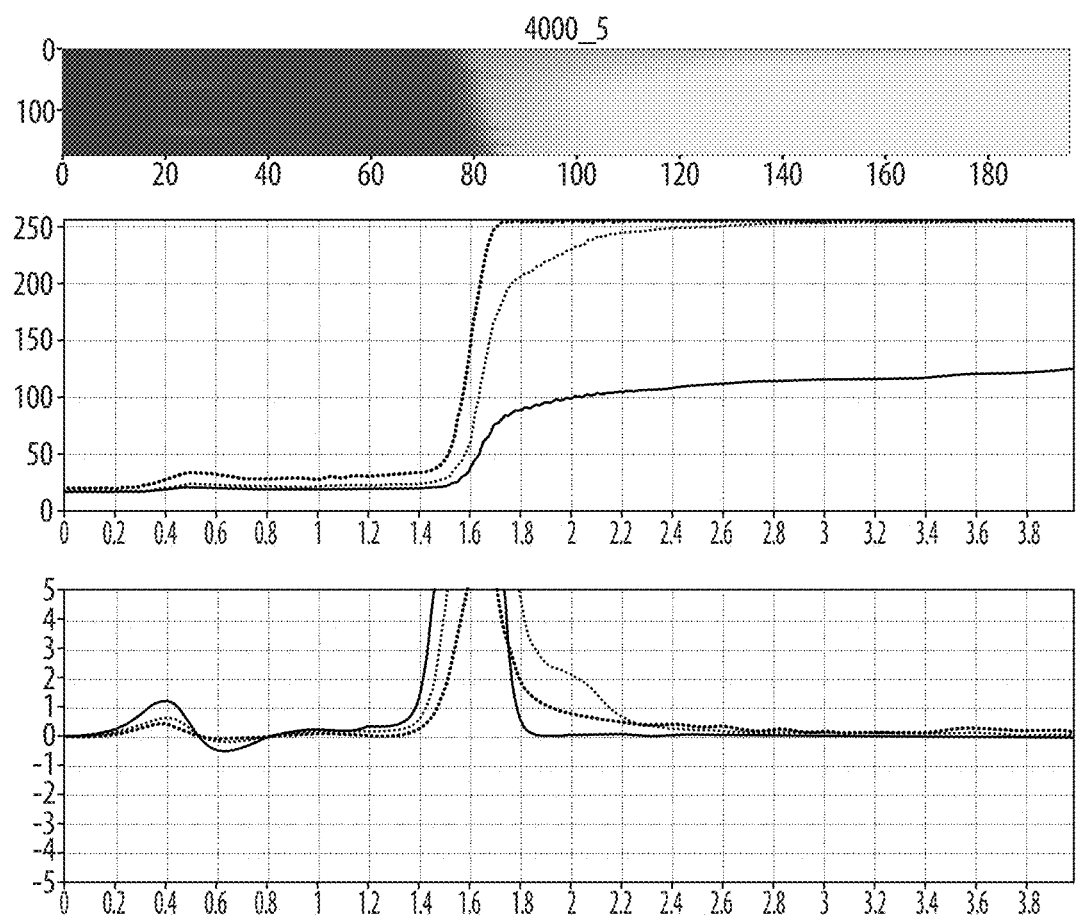
FIG. 5C schematically illustrates detection of a second portion of a view window rectangle, in accordance with some embodiments.
Figure 6C:
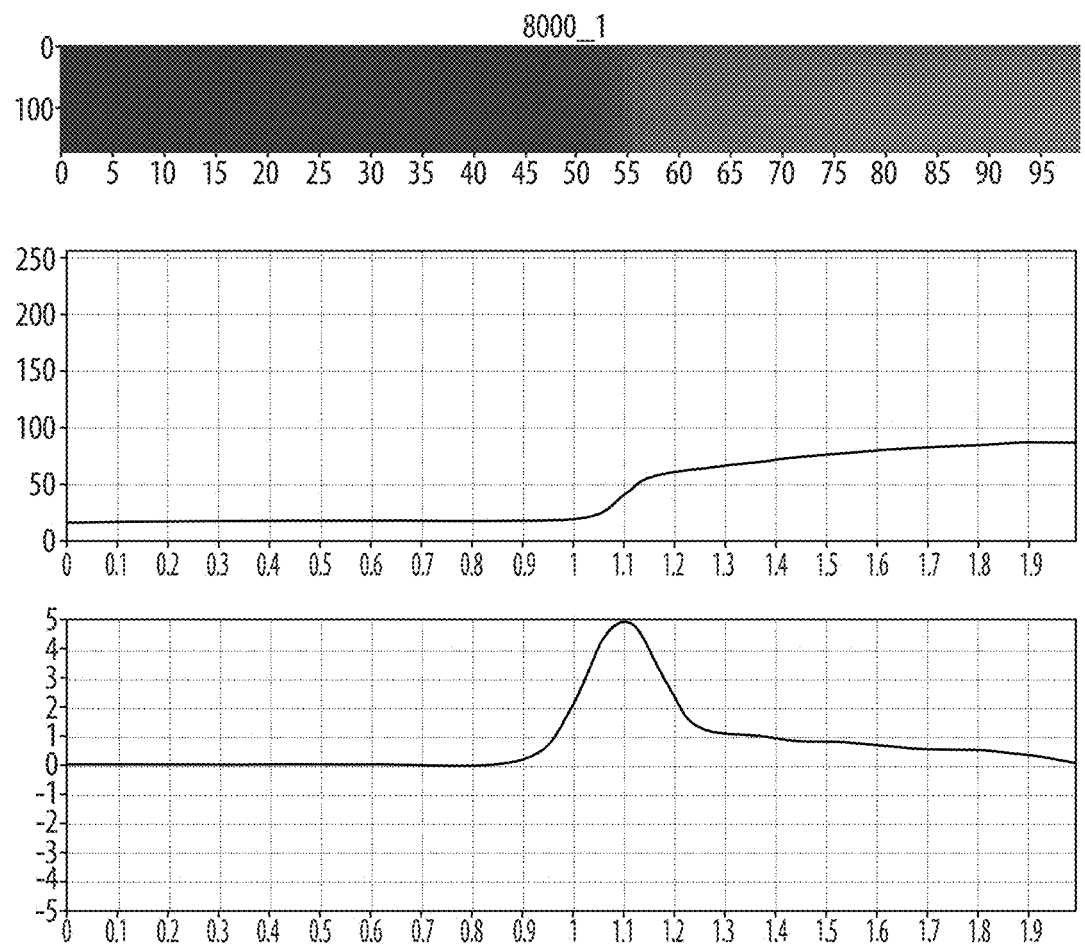

FIG. 4B illustrates a plurality of acts that may be used, in some embodiments, to identify the short sides of the LFA view window in act 330 of process 300. In act 420, a rectangular region of the input full-color (e.g., RGB) image bounded by the two parallel lines (long sides of the view window) identified in act 310 of process 300 is cropped to form a cropped image. In act 422, a single-color (e.g., red, green or blue) image or a grayscale image is extracted from the cropped full-color image. In some embodiments, the color channel to extract in act 422 may be specified in user-defined parameters 104. In act 424, a one-dimensional (1D) intensity signal is determined from the single-color image or grayscale image by averaging across the dimension perpendicular to the long sides of the view window, so that each sample in the extracted 1D intensity signal is the average intensity over a vector parallel with the short sides of the view window. In act 426, one-dimensional edge detection is performed at each end of the 1D intensity signal determined in act 424. In some embodiments, edge detection is performed in act 424 by identifying one or more peaks in the 1D intensity signal and selecting a desired peak based on particular criteria (e.g., minimum contrast, polarity). In some embodiments, the particular criteria used to select a desired peak are specified in user-defined parameters 104. Non-limiting examples of identifying the short sides of an LFA view window by selecting desired peaks in the 1D intensity signal in accordance with some embodiments are shown in FIGS. 5C and 6C.

Figure 4C:
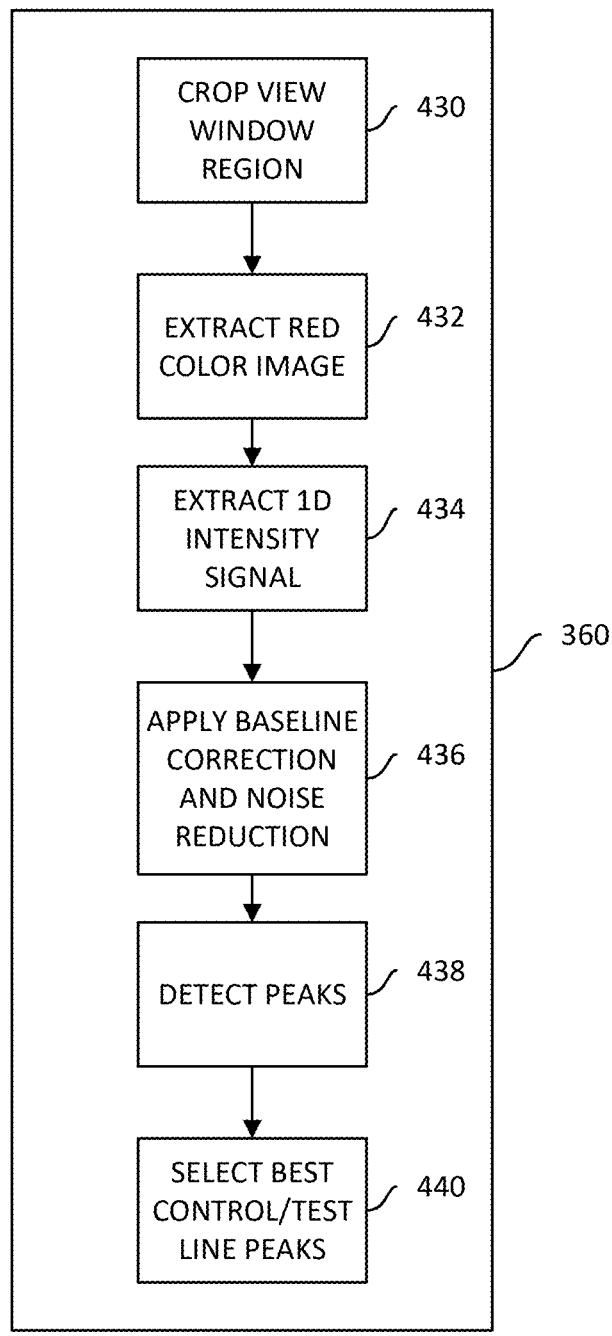
FIG. 4C shows a flowchart of a process for processing a signal within a view window rectangle in an image, in accordance with some embodiments.

FIG. 4C illustrates a plurality of acts that may be used, in some embodiments, to analyze signals within an extracted LFA view window in act 360 of process 300. In act 430, the rectangular LFA view window region computed during the assay alignment phase is extracted from the input full-color image. In act 432, the red channel of the full-color image is extracted from the cropped view window region from act 430. It should be appreciated that acts 430 and 432 could alternatively be performed in the opposite order and produce a similar or identical result. It should also be appreciated that a different color channel (e.g., a green or blue color channel) or a blended color channel may alternatively be extracted in act 432, as embodiments are not limited in this respect. In act 434, a 1D intensity signal is computed from the cropped red channel image extracted in act 432. For example, the 1D intensity signal may be computed in act 434 by averaging across the short dimension of the view window, so that each sample in the extracted 1D intensity signal is the average intensity over a vector parallel with the control/test lines, which also are expected to be oriented along the short dimension of the view window.

Figure 5D:
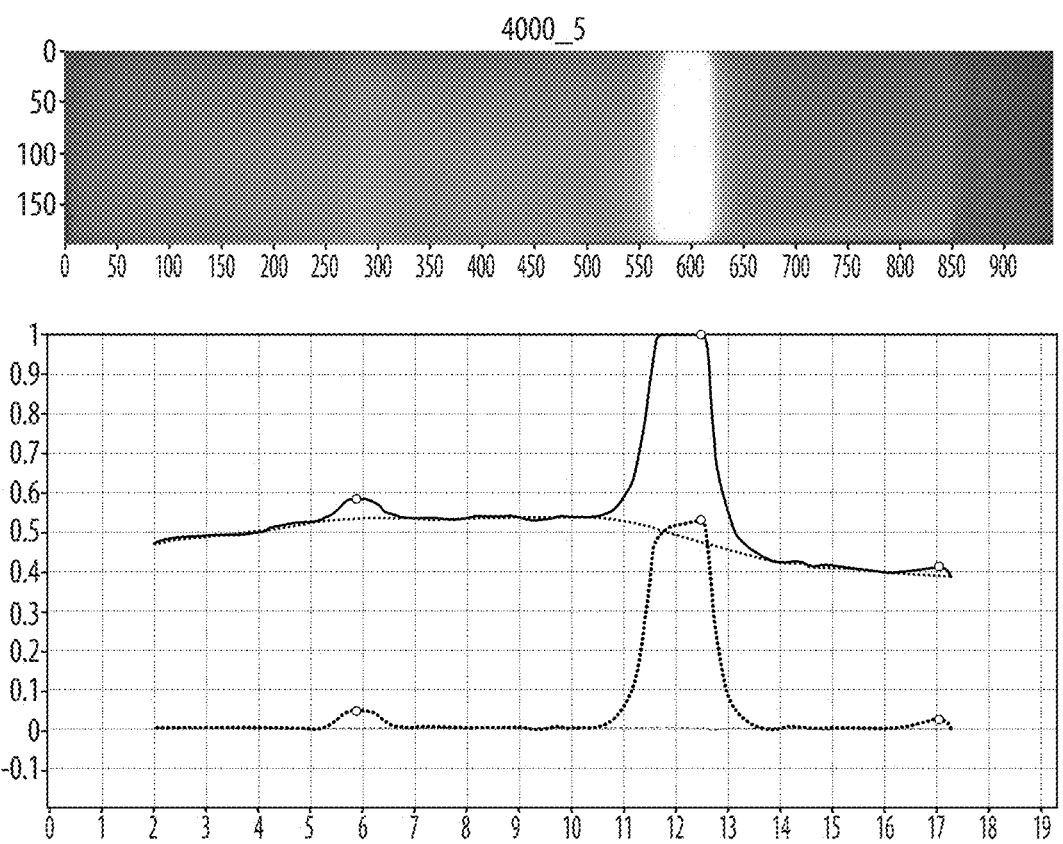
FIG. 5D schematically illustrates a baseline correction process, in accordance with some embodiments.
Figure 6D:
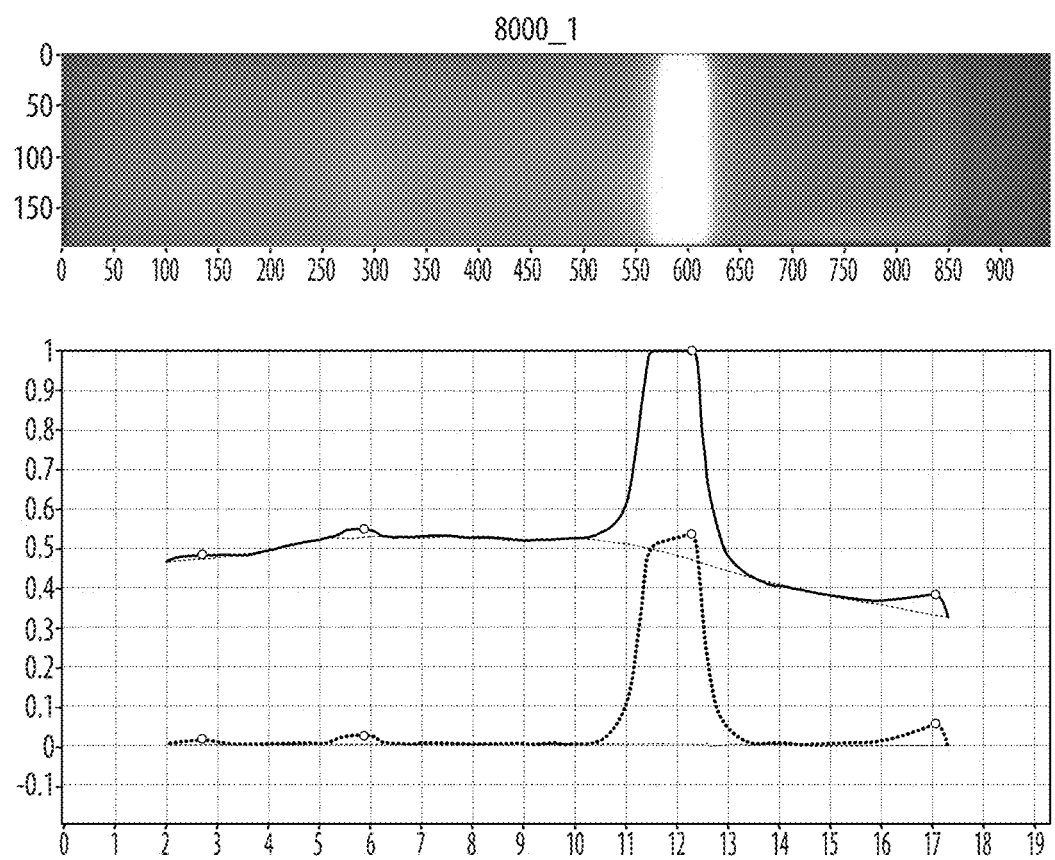

In act 436, the 1D red channel intensity signal (referred to as the "raw signal") is processed to perform baseline correction and noise reduction to improve the quality of the signal. The baseline correction and noise reduction may be performed in any suitable way. In some embodiments, the raw signal is assumed to be the sum of (1) background visible color of the LFA membrane (the baseline), (2) additional signal generated by visibility of control/test line(s), and (3) random noise induced by the imaging system. To estimate the baseline in the raw signal a penalized least-squares smoothing technique may be applied to the raw signal, and the estimated baseline may be subtracted from the raw signal, resulting in a noisy baseline corrected signal. A noise reduction filter (e.g., a 1D Gaussian smoothing filter) may then be applied to the noisy baseline corrected signals, resulting in a fully-corrected (i.e., baseline and noise corrected) signal. Non-limiting examples of performing baseline and noise correction in accordance with some embodiments are shown in FIGS. 5D and 6D.

Figure 5E:
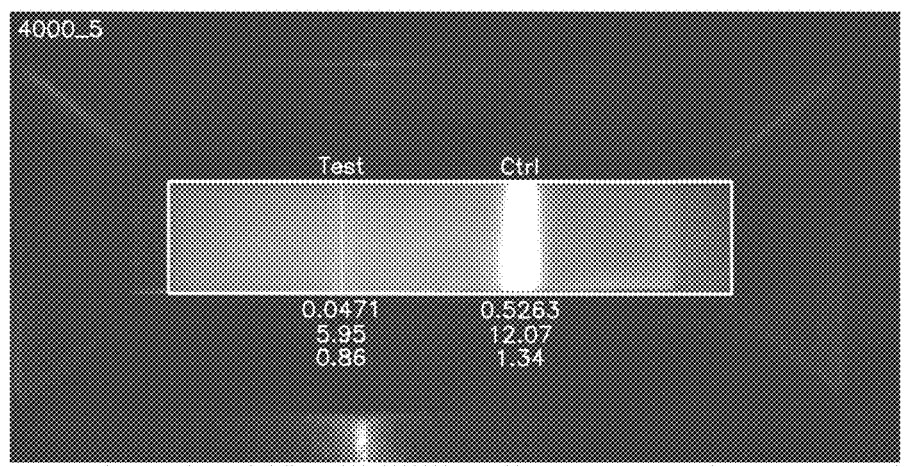
FIG. 5E illustrates an example of an aligned and annotated view window, in accordance with some embodiments.
Figure 6E:
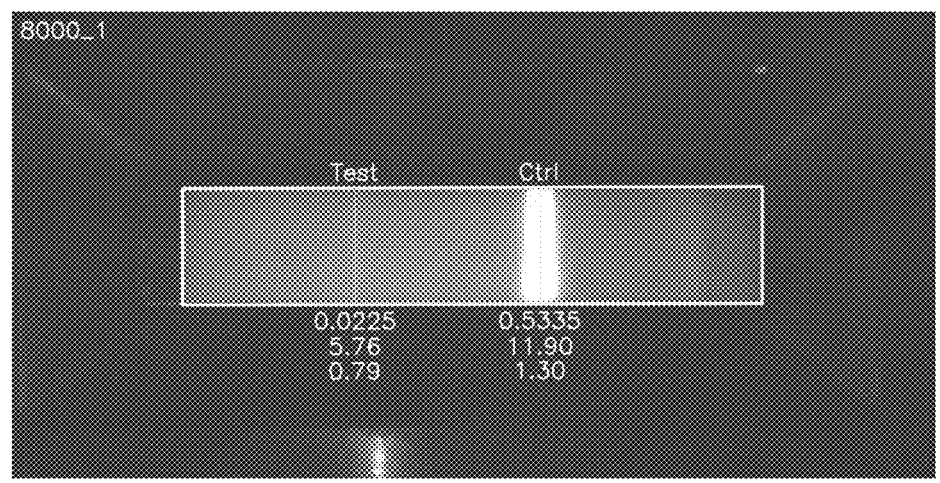

In act 438, local peaks are detected in the fully-corrected signal output from act 436. For example, a rules-based peak detection technique may be used to detect the local peaks in act 438. In act 440, the control line and the one or more test lines are matched to the detected local peaks identified in act 438. For instance, the inventors have recognized that each visible control/test line signal in the image should correspond to a significant peak in the fully-corrected signal output from act 438. There may, however, also be additional peaks detected that do not correspond to a control or test line, which may generate a false positive. In some embodiments, the user-defined parameters provided as input to process 300 may specify nominal control/test line locations. In such embodiments, the peak nearest in position to the nominal line and also satisfying the following conditions may be selected in act 440 as matching to a control/test line: (a) positional error does not exceed user-defined positional tolerance, (b) peak height exceeds user-defined detection threshold, and (c) peak width lies between user-defined min/max width limits. Non-limiting examples of matching peaks to nominal control/test lines in an image in accordance with some embodiments are shown in FIGS. 5E and 6E, which show view windows for two different LFAs aligned and annotated using the techniques described herein.

Based on the matching of the nominal control/test line locations and the local peaks in the signal, it is determined whether the diagnostic test is invalid and cannot be read and/or whether the diagnostic test result is positive or negative, as shown in the flowchart of FIG. 3. For example, if no peak is selected for the control line, then the diagnostic test is considered invalid. If a peak is selected for a test line and the signal intensity of the peak exceeds a threshold value, then the diagnostic test result is considered to be positive. Otherwise, the diagnostic test result is considered to be negative.

Although the embodiments described above compare a signal intensity of a control line and one or more test lines in a captured image to determine a diagnostic test result, it should be appreciated that other signal measurements may also be used. For instance, in some embodiments an LFA may be illuminated with one or more light sources and a lifetime of a signal emitted by the LFA and excited by the illumination may be measured and used to determine the diagnostic test result.

Figure 7:
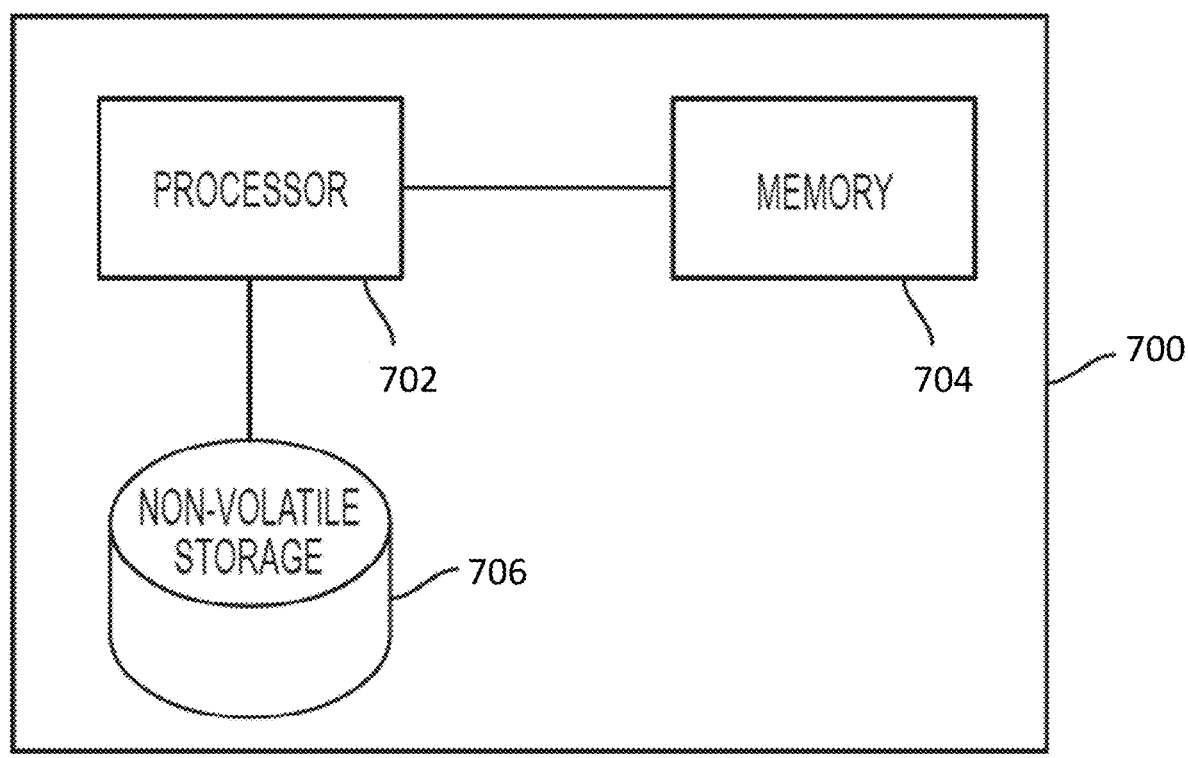
FIG. 7 illustrates an example hardware computer system on which some embodiments may be implemented.

An illustrative implementation of a computing system that may be used in connection with any of the embodiments of the disclosure provided herein is shown in FIG. 7. For example, any of the computing devices described above may be implemented as computing system 700. The computer system 700 may include one or more computer hardware processors 702 and one or more articles of manufacture that comprise non-transitory computer-readable storage media (e.g., memory 704 and one or more non-volatile storage devices 706). The processor 702(*s*) may control writing data to and reading data from the memory 704 and the non-volatile storage device(s) 706 in any suitable manner. To perform any of the functionality described herein, the processor(s) 702 may execute one or more processor-executable instructions stored in one or more non-transitory computer-readable storage media (e.g., the memory 704), which may serve as non-transitory computer-readable storage media storing processor-executable instructions for execution by the processor(s) 702.

As described above, in some embodiments, a light source. The light source may be a source of any type of electromagnetic radiation (i.e., electromagnetic radiation of any wavelength). Suitable types of electromagnetic radiation that may be emitted light source include, but are not limited to, ultraviolet radiation (e.g., having a wavelength in a range from about 10 nm to about 380 nm), visible light (e.g., having a wavelength in a range from about 380 nm to about 740 nm), near-infrared radiation (e.g., having a wavelength in a range from about 700 nm to about 800 nm), and infrared radiation (e.g., having a wavelength in a range from about 740 nm to about 3 μm).

The computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some cases, devices and methods described herein advantageously allow consumers to use consumer-level electronics with imaging capabilities (e.g., a smartphone, a digital camera, a tablet, a laptop, a home automation device, a smartwatch, a desktop computer) to evaluate an assay such as an LFA. Advantageously, the devices and methods described herein may be implemented on consumer-level electronics such as cellular phones (e.g., smartphones, iPhones, Android phones), digital cameras, tablets (e.g., iPads), laptop computers, home automation devices, watches (e.g., smartwatches), and/or desktop computers. These consumer electronics may be used with filters or other accessories, but in some cases for the devices and methods described herein, such filters will not be required. However, the devices and methods are not limited to consumer-level electronics and may be implemented on other systems and devices as well.

Predictive modeling and/or machine learning techniques may be incorporated, in some embodiments, with the devices and systems described herein. One non-limiting example of predictive modeling and/or machine learning useful for the devices and systems described herein includes within the area of defect detection. For example, images collected of known defective LFA's, along with other corresponding data such as time and temperature, may be used to train a predictive model for identifying defective LFA's. In some embodiments, such a trained model(s) may be used to identify defective LFA's in the field and, for example, reporting them to the end-user as an invalid test result.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the terms "physical processor" or "computer processor" generally refer to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that embodiments of a robot may include at least one non-transitory computer-readable storage medium (e.g., a computer memory, a portable memory, a compact disk, etc.) encoded with a computer program (i.e., a plurality of instructions), which, when executed on a processor, performs one or more of the above-discussed functions. Those functions, for example, may include control of the robot and/or driving a wheel or arm of the robot. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

In some embodiments, the systems, devices, and methods described herein may comprise one or more additional components. Such additional components are generally described in co-owned U.S. patent application Ser. No. 17/073,189, entitled "LUMINESCENCE IMAGING FOR SENSING AND/OR AUTHENTICATION" filed Oct. 16, 2020 and co-owned U.S. patent application Ser. No. 17/073, 232, entitled DIAGNOSTIC ASSAYS AND RELATED METHODS filed Oct. 16, 2022, each of which is incorporated by reference in its entirety. For example, the systems, devices, and methods described herein may comprise one or more additional components selected from the group consisting of sources of electromagnetic radiation (e.g., light source), excitation components, electromagnetic radiation sensors, photodetectors, emissions, processing circuitry, power sources, chemical tags, and emissive species e.g., as generally disclosed in the above-referenced applications. Other additional components are also possible and those of ordinary skill in the art would be capable of selecting suitable additional components based upon the teachings of the instant specification.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

The invention claimed is:

1. A diagnostic reader device for automatically reading a lateral flow assay to determine a diagnostic test result of the lateral flow assay, the diagnostic reader device comprising:
   a test interface configured to receive a cassette having disposed therein the lateral flow assay;
   at least one light source configured to illuminate the lateral flow assay when present in the test interface;
   an imaging device configured to capture at least one image of the lateral flow assay after illumination with the at least one light source; and
   a hardware computer processor programmed to analyze the at least one image of the illuminated lateral flow assay to determine the diagnostic test result, wherein analyzing the at least one image comprises:
      identifying a view window in the at least one image of the illuminated lateral flow assay, the identifying comprising:
         identifying parallel long sides of the view window;
         when the parallel long sides of the view window are identified, identifying parallel short sides of the view window; and
         when the parallel short sides of the view window are identified, compute a boundary defining the view window based on the parallel long sides and the parallel short sides;
      determining, within the identified view window, a first signal strength for a control line and a second signal strength for one or more test lines;
      determining the diagnostic test result based on the first signal strength and/or the second signal strength; and
      outputting an indication of the diagnostic test result.

2. The diagnostic reader device of claim 1, wherein the at least one light source comprises one or more light emitting diodes.

3. The diagnostic reader device of claim 2, wherein the one or more light emitting diodes include one or more ultraviolet light emitting diodes.

4. The diagnostic reader device of claim 1, wherein the imaging device is configured to capture at least one RGB image of the lateral flow assay.

5. The diagnostic reader device of claim 1, further comprising:
   a controller configured to control a timing of illumination of the lateral flow assay and a timing of capture of the at least one image by the imaging device.

6. The diagnostic reader device of claim 5, wherein controlling a timing of illumination of the lateral flow assay comprises controlling a timing of illumination of the lateral flow assay at different times, durations, wavelengths, or locations in the lateral flow assay.

7. The diagnostic reader device of claim 6, wherein controlling a timing of illumination of the lateral flow assay at different wavelengths comprises illuminating the lateral flow assay with first illumination having at least one first wavelength at a first time and illuminating the lateral flow assay with second illumination having at least one second wavelength at a second time after the first time.

8. The diagnostic reader device of claim 7, wherein the first illumination corresponds to white light and wherein the second illumination corresponds to ultraviolet light.

9. The diagnostic reader device of claim 6, wherein controlling a timing of illumination of the lateral flow assay at different locations comprises illuminating a first portion of the lateral flow assay with first illumination at a first time and illuminating a second portion of the lateral flow assay with second illumination at a second time after the first time, wherein the first portion includes a location on lateral flow assay in which the control line is expected to appear and wherein the second portion includes a location on the lateral flow assay in which the one or more test lines are expected to appear.

10. The diagnostic reader device of claim 1, further comprising:
    a circuit board having integrated thereon, the hardware computer processor.

11. The diagnostic reader device of claim 1, further comprising:
    a wireless communications interface, and
    wherein outputting the indication of the diagnostic test result comprises transmitting the diagnostic test result to at least one computing device external to the diagnostic reader device via the wireless communications interface.

12. The diagnostic reader device of claim 11, wherein the at least one computing device is a smartphone, a tablet computer, or a desktop computer.

13. The diagnostic reader device of claim 1, wherein the hardware computer processor is further programmed to receive user-defined parameters and calibration data, and wherein analyzing the at least one image comprises analyzing the at least one image based, at least in part, on the received user-defined parameters and/or the calibration data.

14. The diagnostic reader device of claim 13, wherein the user-defined parameters relate to a design of the lateral flow assay in the at least one image.

15. The diagnostic reader device of claim 13, wherein the user-defined parameters include one or more parameters selected from the group consisting of: dimensions of the lateral flow assay, visual appearance information, and nominal positions of the control line and/or the one or more test lines.

16. The diagnostic reader device of claim 13, wherein the calibration data relates to one or more characteristics of the diagnostic reader device.

17. The diagnostic reader device of claim 13, wherein the calibration data includes one or more of: optical magnification data, expected lateral flow assay orientation data, or lateral flow assay direction data.

18. The diagnostic reader device of claim 1, wherein analyzing the at least one image comprises:
    when the parallel long sides or the parallel short sides of the view window fail to be identified, determining that the diagnostic test result is invalid.

19. The diagnostic reader device of claim 1, wherein the view window is a rectangle comprising the long sides and the short sides.

20. The diagnostic reader device of claim 19, wherein the at least one image comprises an RGB image, and wherein identifying the long sides of the rectangle comprises:

extracting a first image from the RGB image, wherein the first image is a single-color channel image or a grayscale image;

applying a noise reduction filter to the first image to produce a second image;

estimating a gradient magnitude at each pixel in the second image;

producing a binary edge map by applying a thresholding operation to the estimated gradient magnitude estimated for each pixel in the second image;

segmenting the binary edge map to identify pixels corresponding to a set of edge points consistent with two parallel lines separated by a predetermined distance; and identifying the long sides of the rectangle based on the identified pixels corresponding to the set of edge points.

21. The diagnostic reader device of claim 20, wherein applying the noise reduction filter comprises applying a two-dimensional Gaussian smoothing filter.

22. The diagnostic reader device of claim 19 or 20, wherein identifying second parallel sides comprises identifying the short sides of the rectangle.

23. The diagnostic reader device of claim 22, wherein the at least one image comprises an RGB image, and wherein identifying the short sides of the rectangle comprises:

cropping a portion of the RGB image based on the identified long sides of the rectangle;

extracting, from the cropped RGB image, a third image, wherein the third image is a single-color channel image or a grayscale image and has a long dimension and a short dimension;

determining, from the third image, a one-dimensional intensity signal by averaging pixel values across the short dimension of the third image; and identifying the short sides of the rectangle by applying one-dimensional edge detection to the one-dimensional intensity signal.

24. The diagnostic reader device of claim 23, wherein applying one-dimensional edge detection comprises:

determining a gradient of the one-dimensional intensity signal; and selecting one or more peaks in the determined gradient of the one-dimensional intensity signal.

25. The diagnostic reader device of claim 18, wherein identifying the view window based on the identified first and second parallel sides comprises identifying the view window based, at least in part, on the first parallel sides being perpendicular to the second parallel sides.

26. The diagnostic reader device of claim 1, wherein the at least one image comprises an RGB image, and wherein determining, within the identified view window, a first signal strength for a control line and a second signal strength for one or more test lines comprises:

cropping a portion of the RGB image corresponding to the identified view window, wherein the cropped portion has a long dimension and a short dimension;

determining a one-dimensional intensity signal by averaging across the short dimension of the cropped portion;

identifying local peaks based on the one-dimensional intensity signal; and determining the first signal strength and the second signal strength based on the identified local peaks.

27. The diagnostic reader device of claim 26, wherein determining, within the identified view window, a first signal strength for a control line and a second signal strength for one or more test lines further comprises:

performing baseline correction on the one-dimensional intensity signal to generate a baseline corrected intensity signal; and applying a noise reduction filter to the baseline corrected intensity signal to produce a noise corrected intensity signal, wherein identifying local peaks comprises identifying local peaks based on the noise corrected intensity signal.

28. The diagnostic reader device of claim 26, wherein the one-dimensional intensity signal comprises a red-channel intensity signal, a green-channel intensity signal, a blue-channel intensity signal or a grayscale intensity signal.

29. The diagnostic reader device of claim 1, wherein determining the second signal strength for the one or more test lines comprises determining a respective signal strength for each of a first test line and a second test line, and determining the diagnostic test result is further based on the respective signal strength determined for the first test line and the respective second signal strength determined for the second test line.

30. The diagnostic reader device of claim 1, wherein the indication of the diagnostic test result indicates whether the test was invalid, negative or positive.

31. The diagnostic reader device of claim 1, wherein the indication of the diagnostic test result is a numerical value.

32. A non-transitory computer readable medium having encoded thereon, a plurality of instructions that, when executed by a hardware computer processor, perform a method for automatically reading a lateral flow assay to determine a diagnostic test result of the lateral flow assay, the method comprising:

receiving at least one image of the lateral flow assay captured by an imaging device after illumination of the lateral flow assay by at least one light source;

identifying, with a hardware computer processor, a view window in the at least one image of the illuminated lateral flow assay, the identifying comprising:

identifying parallel long sides of the view window;

when the parallel long sides of the view window are identified, identifying parallel short sides of the view window; and when the parallel short sides of the view window are identified, compute a boundary defining the view window based on the parallel long sides and the parallel short sides;

determining, within the identified view window, a first signal strength for a control line and a second signal strength for one or more test lines;

determining the diagnostic test result based on the first signal strength and/or the second signal strength; and outputting an indication of the diagnostic test result.

* * * * *